United States Patent [19]
Nadel et al.

[11] Patent Number: 6,045,280
[45] Date of Patent: Apr. 4, 2000

[54] CONTAINER WITH INTEGRAL WIPER

[75] Inventors: Murray Nadel, New Rochelle, N.Y.; Daren Mark D'Andrea, Stamford, Conn.

[73] Assignee: Nadel Industries, Inc., Port Chester, N.Y.

[21] Appl. No.: 09/103,244

[22] Filed: Jun. 23, 1998

[51] Int. Cl.$^7$ .................................................. A46B 17/08
[52] U.S. Cl. .............................................................. 401/122
[58] Field of Search ................................ 401/121, 122, 401/206, 220

[56] References Cited

U.S. PATENT DOCUMENTS

| | | |
|---|---|---|
| 2,741,402 | 4/1956 | Sayre . |
| 4,705,053 | 11/1987 | Goncalves . |
| 4,784,505 | 11/1988 | Dahm . |
| 4,921,366 | 5/1990 | Hurrell ...................................... 401/126 |
| 5,465,856 | 11/1995 | Sheffler . |
| 5,727,280 | 3/1998 | Romano .................................. 15/248.1 |

*Primary Examiner*—Steven O. Douglas
*Assistant Examiner*—Peter deVore
*Attorney, Agent, or Firm*—Amster, Rothstein & Ebenstein

[57] ABSTRACT

A container for holding a liquid product to be applied by an applicator comprising a two piece plastic body having a base section and a top section. The top section further comprises an integral shoulder and neck section. The neck section of the top section includes an integral wiper element extending radially from an inner wall of the neck section for wiping excess liquid from an applicator.

7 Claims, 3 Drawing Sheets

CONTAINER WITH INTEGRAL WIPER

BACKGROUND OF THE INVENTION

1. Field of the Invention

The present invention relates generally to a plastic molded container and, in particular, to a molded plastic container having an integral wiper element for removing excess liquid product prior to its application.

2. Prior Art

Fingernail related liquid products such as enamel polishes, base coats, top coats, nail conditioners, cuticle creams, etc. are conventionally packaged and dispensed from glass containers or bottles. The glass container includes a base section which is typically cylindrical in shape having an upwardly extending threaded, externally cylindrical neck section. Secured to the neck section is an internally threaded plastic closure cap having an attached depending applicator brush for applying the liquid product in the base section.

Glass is preferred by manufactures and distributors of nail related liquid products due to its relatively low cost and ease of manufacturing. Additionally glass is preferred due to its durability and inherent aesthetic advantages such as, for example, its transparent quality which permits any shade of polish to be prominently displayed and easily identified by the consumer.

Glass containers or bottles, however, are in many respects not ideal for use in dispensing liquid fingernail related products such as nail polish. While glass containers are generally made using a thick glass for safety reasons, the thick glass adds to the overall weight of the container. This is especially a disadvantage when shipping a large quantity of individual containers. Also, even though the glass is generally thick and impact resistant, the glass may nevertheless be shattered with a sufficient impact, particularly along the neck portion of the bottle.

Perhaps the most notable shortcoming of glass as a medium is the inability to shape or permanently attach a wiper element which can be used to control the quantity of the liquid product to be dispensed from a particular bottle. At present, the excess product which is drawn from a container is wiped along the top edge of the glass neck section, and this usually results in the liquid product dripping over the edge onto the exterior of the bottle. In this manner, the liquid product is not only wasted, but the excess which has dripped onto the exterior can dry on and between the neck threads, thereby making it very difficult to remove or secure the cap. Moreover, an excess amount of the product remains on the brush which results in an uneven application of the product.

In U.S. Pat. No. 4,784,505, a container is disclosed having a threaded wiper insert which is threaded within the interior of a plastic container. Although effective, the wiper element is a separate component and thus not integral with the container. Such a prior art configuration is generally more expensive to manufacture and requires that multiple pieces be fabricated and later assembled.

It is also known in the prior art to manufacture thermoplastic containers by joining separately molded sections. An example is U.S. Pat. No. 5,465,856 which discloses a method of manufacturing a plastic container by joining two separately injection molded sections.

It is not known, however, to provide a two piece plastic container having an integrally molded wiper in the neck portion thereof for wiping excess product prior to its application.

Thus a need continues to exist for a container that has the strength, durability and aesthetic advantages of a glass container yet may be adapted to include an integral wiper element which can be used to control the amount of polish to be applied.

Accordingly, it is therefore an object of the present invention to provide a container for a liquid such as nail polish, which container is as resilient and durable as the prior art glass container.

It is another object to provide such a container which includes an integral wiper element.

It is a further object to provide such a container which is injection molded and includes an integral wiper element for wiping off excess liquid product.

SUMMARY OF THE INVENTION

In accordance with the stated objectives and other objectives which will become apparent herein, there is provided a container for holding a liquid to be applied by an applicator wherein the container comprises a molded plastic base section and a molded plastic top section. The base and top sections are separately molded and have free edges adapted for joining the sections together to form a unitary body. The top section further comprises a neck portion which includes an inner wall and a molded integral wiper element extending radially inwardly therefrom for wiping excess liquid from the applicator.

In a preferred embodiment, the edges along which the base and top sections are joined are configured to have mating edges for improving the strength and aesthetic appearance of the junction between the base and top sections.

The molding method enables many different configurations to be used for the base and neck sections. In an exemplary implementation, the container is injection blow molded from a thermoplastic polyester to have a base which is generally cylindrical or oval in shape and a generally cylindrical neck section. The integral wiper element, which may also have a number of configurations, preferably has a substantially triangular cross section.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction wish the accompanying drawings, wherein.

DETAILED DESCRIPTION OF THE PREFERRED EMBODIMENTS

Figure 2:
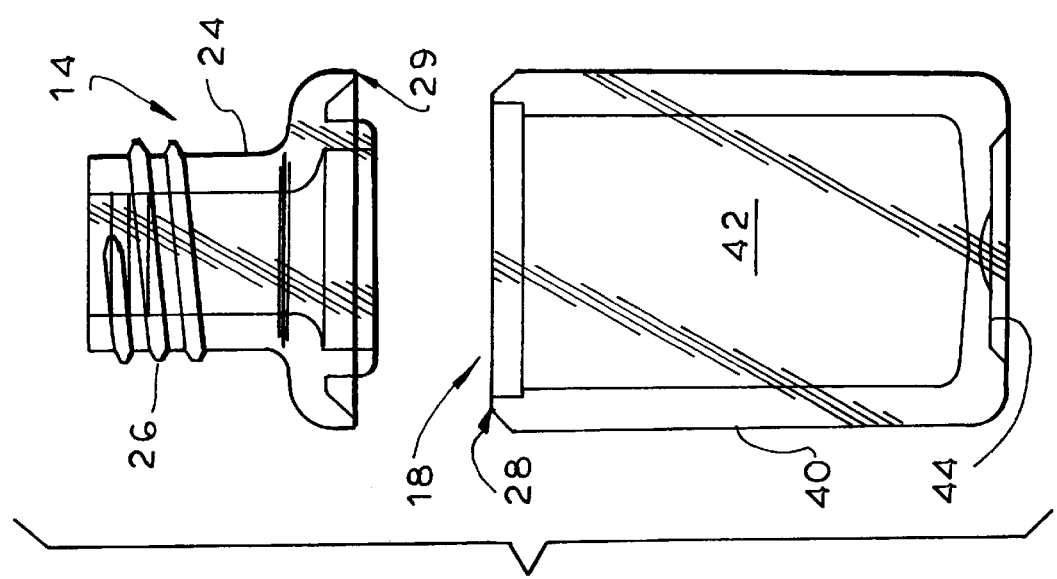
FIG. 2 is an exploded view thereof.
Figure 1:
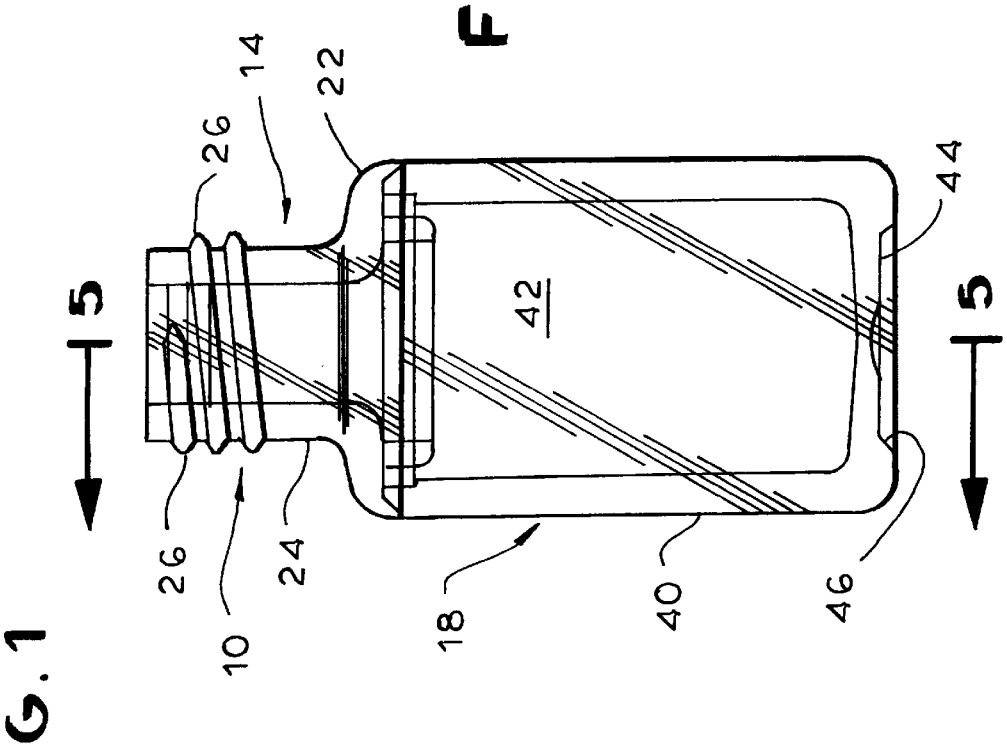
FIG. 1 is front elevational view of a container in accordance with a preferred embodiment of the present invention.

Referring now to the drawings and particularly to FIGS. 1 and 2 thereof, therein illustrated is a plastic container in accordance with a preferred embodiment of the present invention, generally designated by the reference numeral 10. The container is generally comprised of a molded plastic top or upper section generally designated 14 and a molded plastic base section generally designated 18.

The top section 14 is comprised of a shoulder section 22 which extends upwardly into an integral neck section 24, preferably formed in a single molding operation. The neck section 24 further comprises a plurality of external threads 26 disposed circumferentially along an outer wall for accepting a conventional internally threaded closure cap (not shown). As is well known in the prior art, the closure cap is provided with corresponding threads to secure the cap to the threaded neck 24 and includes a depending applicator brush which is used to apply the liquid product contained in the container.

Figure 3:
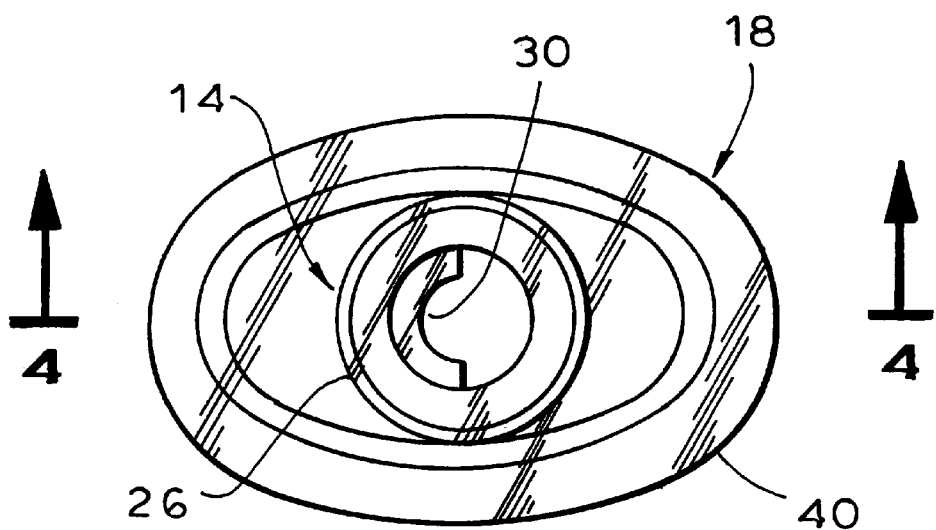
FIG. 3 is a top view thereof.
Figure 4:
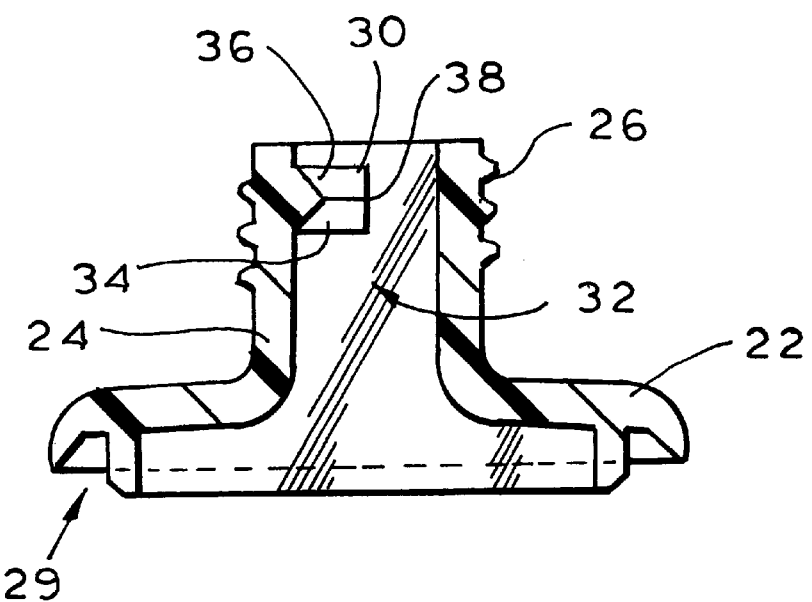
FIG. 4 is a cross section thereof, taken along line 4—4 of FIG.3.

An integral wiper element 30 (see FIGS. 3–6) is molded along an inner wall of the neck section 24. The wiper element 30 extends along the inner wall, preferably in substantially a 180 degree arc. As best seen in FIG. 3, the wiper element 30 extends radially within the interior of the opening 32 defined by the neck 24. The opening 32 is in communication with the liquid product being held in the base section 18.

To facilitate wiping of the excess liquid, the wiper element 30 is configured to be generally wedge shaped, having first and second radially extending sloping walls 34, 36 which meet and form a peripheral edge 38 against which an applicator brush may be wiped. In co-molding wiper element 30, adequate clearance should be provided to permit the applicator brush to pass unimpeded through the opening 32 into the base section 18.

Figure 5:
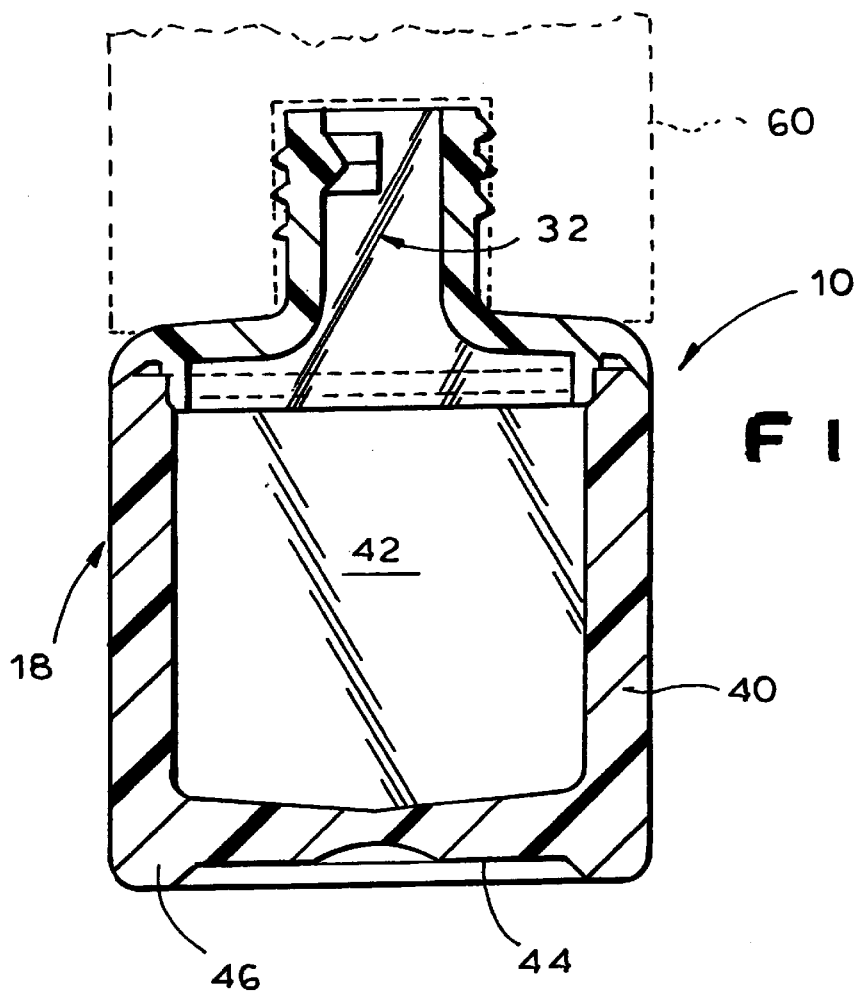
FIG. 5 is a sectional view thereof, taken along the line 5—5 of FIG. 1, showing in phantom line a horn used in ultrasonic welding being applied to a top section thereof.

Many configurations for the shape and dimension of the elements of the container 10 are possible utilizing conventional molding techniques. Referring now to FIG. 5 in particular, in the preferred embodiment the base section includes a generally oval or cylindrical sidewall 40 defining a chamber 42 wherein the liquid product is held. At the lower end of the sidewall 40, opposite the neck section 24, the sidewall 40 extends below a bottom wall 44 of the container 10 to form a skirt or flange 46 for supporting the container 10.

In accordance with the preferred embodiment, each of the sections 14, 18 are individually injection blow molded from a thermoplastic polyester. Although the plastic container 10 of the present invention may also be produced by other molding processes, such as extrusion blow molding and stretch blow molding, it is commonly accepted in the prior art that greater precision may be obtained utilizing an injection blow molding process. This precision is necessary for controlling wall thickness and the shape and dimension of an integral wiper element.

Figures 6, 7:
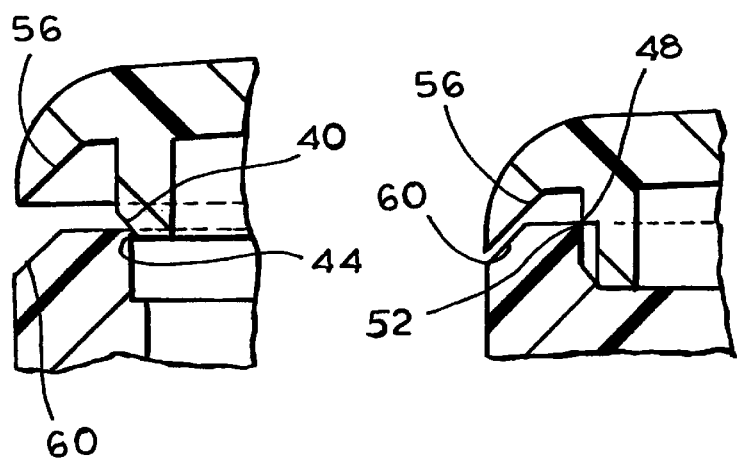
FIG. 6 is an enlarged fragmentary view of a section at an initial step in the welding process used to join the sections forming the container of the preferred embodiment.
FIG. 7 is an enlarged fragmentary view of the section after the initial step.

To form a useful container 10, the sections 14, 18 must be joined together along their free edges. In order to improve the connection between the free edges of the sections 14, 18, they may be provided with various complementary edge configurations. As best shown in FIGS. 5–7, a variation of a "rabbited" or "tongue and groove" joint is shown as the preferred means of joining the top and base sections 14, 18. In accordance with the terminology used herein, the base section 18 includes a "tongue" edge 28, and the shoulder section 24 of the top section 14 includes a "groove" edge 29, thereby to complete a "tongue and groove" configuration. The groove 29 is defined by concentric inner and outer walls dimensioned to accept the free edge or tongue 28 of the base section 18. When the sections 14, 18 are joined in this manner, the likelihood that the sections 14, 18 will form a permanent bond with few aesthetic defects is greatly enhanced.

As is known in the prior art, plastics may be joined by any number of methods including adhesive bonding, solvent bonding, spin welding, induction heating or ultrasonic welding. In most instances, the particular method available is limited by the type of plastic material being used in the molding process. Several methods of joining plastic sections, however, may be available for a given type of plastic.

In the preferred embodiment, the base and top sections 14, 18 which are separately molded from a thermoplastic polymer such as a polyester, are typically joined by adhesive bonding or ultrasonic welding. The adhesive bonding process is very much as it sounds: a high strength adhesive is applied at the junction of the base and top sections 14, 18 establishing a permanent bond. Acceptable adhesives include thermosetting adhesives such as epoxies, polyurethanes, or acrylics. A disadvantage of this process is that, although a strong bond may be formed, surface treatments may be required to improve the aesthetic appearance of the resulting container.

The preferred method employed when using a thermoplastic polyester is ultrasonic welding. During ultrasonic welding a high frequency electrodynamic field is generated that resonates a metal horn 60 (see FIG. 6). The resonating horn 60 is placed adjacent the junction of the sections 14, 18 in order that the substrate may be vibrated and an intense heat created at the junction. With pressure and subsequent cooling, a strong and non-fracturable bond is typically obtained.

As generally represented in FIGS. 6 and 7, the joining of top section 14 and base section 18 is progressively accomplished. Initially mating surfaces 40 and 44 come into contact, softening and deforming. Thereafter mating surfaces 48 and 52 come into contact, also softening and deforming, until finally mating surfaces 56 and 60 have come into contact.

To enhance the connection between the upper and lower sections 14, 18 and to improve the exterior appearance of the connection, mating surfaces 56, 60 may be scarfed or angled. In an exemplary embodiment, mating surfaces 56, 60 are disposed at a 45 degree angle relative to the horizontal axis.

Now that the preferred embodiments of the present have been shown and described in detail, various modifications and improvements thereon will become readily apparent to those skilled in the art. Accordingly, the spirit and scope of the present invention is to be construed broadly and limited only by the appended claims, and not by the foregoing specification.

What is claimed is:

1. A container for holding a cosmetic related liquid product to be applied by an applicator, said container comprising:

a molded plastic base section and a molded plastic top section, each of said base and said top sections being separately molded and having free edges adapted for joining said sections, said free edges being fused together to form a unitary body; and said top section comprising a neck portion, said neck portion having a diameter small than a diameter of said molded plastic base section and including an inner wall and an outer wall, said outer wall including means for removably receiving a cap to close off said container and said inner wall including a molded integral wiper element extending radially inwardly from said inner wall of said neck portion for wiping excess liquid from said applicator.

2. The container of claim 1 wherein said cosmetic related liquid product includes at least one of a liquid enamel nail polish, base coat, or fingernail conditioner disposed within said base section.

3. The container of claim 1 wherein said integral wiper extends longitudinally at least half way across said inner wall.

4. A container and cap assembly comprising:

a two piece plastic body having a base section defining a reservoir for containing a cosmetic related liquid product and a shoulder-neck section, said base section including means for joining said base section to said shoulder-neck section and said shoulder-neck section having means for joining said shoulder-neck section to said base section;

a cap for closing off said container, said cap including an applicator connected to said cap and extending downwardly through said shoulder-neck section into said base section;

said shoulder-neck section including a wiper element which is integral with and extends radially from an inner wall of said shoulder-neck section for wiping excess liquid from said applicator; and said shoulder-neck section including a means for removably mounting said cap to said container for closing off said container.

5. The nail polish container of claim 4 wherein said wiper element is generally wedge shaped.

6. A method of molding a two-piece plastic container for holding a cosmetic related liquid product to be applied by an applicator comprising the steps of:

injection molding a base section for containing said cosmetic related liquid product;

injection molding a top section having a neck extending therefrom, said neck having a diameter small than a diameter of said base section and having an outer wall and an inner wall, said outer wall including means for removably receiving a cap to close off said container and said inner wall including an integrally molded wiper radially extending therefrom for wiping excess liquid off an applicator; and permanently joining the base and top sections to form an integral unitary plastic container.

7. The method of claim 6 wherein the base and top sections are joined by means of ultrasonic welding.

* * * * *